United States Patent
Okamoto et al.

(10) Patent No.: US 7,214,761 B2
(45) Date of Patent: *May 8, 2007

(54) HIGHLY THERMAL-CONDUCTIVE RESIN COMPOSITION

(75) Inventors: Satoshi Okamoto, Tsukuba (JP); Tomoya Hosoda, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/125,128

(22) Filed: May 10, 2005

(65) Prior Publication Data

US 2005/0256291 A1 Nov. 17, 2005

(30) Foreign Application Priority Data

May 14, 2004 (JP) .............................. 2004-144665

(51) Int. Cl.
| | |
|---|---|
| *C08G 63/02* | (2006.01) |
| *C08G 63/16* | (2006.01) |
| *C08G 63/18* | (2006.01) |
| *C08G 63/183* | (2006.01) |
| *C08F 20/00* | (2006.01) |
| *C08K 3/00* | (2006.01) |

(52) U.S. Cl. ................... 528/308; 528/308.6; 525/437; 524/401; 428/631

(58) Field of Classification Search ................ 528/308, 528/308.6; 525/437; 524/401; 428/631
See application file for complete search history.

(56) References Cited

U.S. PATENT DOCUMENTS 7,014,921 B2 * 3/2006 Okamoto et al. ............ 428/480
2004/0164282 A1 8/2004 Okamoto et al.

FOREIGN PATENT DOCUMENTS

| JP | 59-168042 A | 9/1984 |
|---|---|---|
| JP | 61-091243 A | 5/1986 |
| JP | 61-101513 A | 5/1986 |

* cited by examiner

*Primary Examiner*—Nathan M. Nutter
(74) *Attorney, Agent, or Firm*—Sughrue Mion, PLLC

(57) ABSTRACT

A resin composition comprising an inorganic material with a thermal conductivity of 10 W/mK or higher at a temperature of 20° C. and an aromatic polyester is provided. The aromatic polyester may have structural units derived from (I) 2-hydroxy-6-naphthoic acid, (II) a compound selected from hydroquinone, 4,4'-dihydroxybiphenyl and 2,6-dihydroxynaphthalene, (III) naphthalenedicarboxylic acid and (IV) a compound selected from terephthalic acid, isophthalic acid and phthalic acid.

9 Claims, No Drawings

HIGHLY THERMAL-CONDUCTIVE RESIN COMPOSITION

BACKGROUND OF THE INVENTION

1. Field of the Invention

The present invention relates to a highly thermal-conductive resin composition. Specifically, the present invention provides a resin composition which is useful, for example, as sealing materials for semiconductors, resistors and capacitors, raw materials for electrical and electronic parts such as substrates and housings, and raw materials for equipment components such as heat exchangers and bearings.

2. Description of the Related Art

With development in electronic technology and with the downsizing, weight reduction and higher performance of electrical and electronic equipment, materials therefore have been exchanged from metallic materials to plastics. In addition, materials which are superior in heat release and heat resistance to heat generation inside the equipment, have greatly been required especially as materials for electrical and electronic equipment (for example, sealing materials for exothermic parts such as semiconductors, resistors and capacitors; materials for parts such as substrates and housings; and raw materials for equipment components such as heat exchangers and bearings). Plastics, however, are generally materials having low thermal conductivity, which is not preferable property for a electrical and electronic equipment. Thus, methods for modifying a plastic to be a conductor with a high thermal conductivity, have diversely been studied. One of such methods is to add inorganic fillers (including metal) having high conductivity to plastics, (see, Japanese Patent Application Laid-Open No. (JP-A-)59-168042, JP-A-61-91243, and JP-A-61-101513). Such modified plastics, however, do not always have sufficiently high conductivity.

SUMMARY OF THE INVENTION

One of objects of the present invention is to provide a resin composition with a high thermal conductivity.

The present invention provides a resin composition comprising an inorganic material with a thermal conductivity of 10 W/mK or higher at a temperature of 20° C. and an aromatic polyester having structural units represented by formulas (I)–(IV)

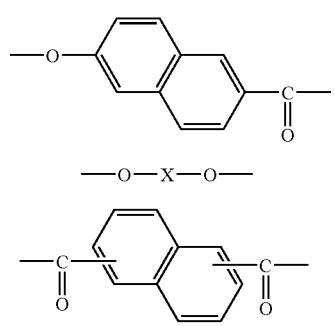

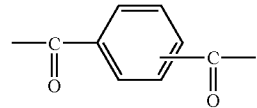

wherein x represents a structural unit selected from a group consisting of 1,4-phenylene, 4,4'-biphenylene and 2,6-naphthylene.

According to the present invention, a resin composition with a high thermal conductivity is provided.

DETAILED DESCRIPTION OF PREFERRED EMBODIMENTS

In the present application, an aromatic polyester having structural units represented by formulas (I)–(IV), is used.

wherein x represents a structural unit selected from a group consisting of 1,4-phenylene, 4,4'-biphenylene and 2,6-naphthylene.

The aromatic polyester may have ester linkages between structural units represented by the above-mentioned formulas (I)–(IV). The polyester may be classified into a thermotropic liquid crystal polymer and may provide on anisotropic melt at a temperature of 400° C. or less.

Structural unit (I) may be a structural unit derived from 2-hydroxy-6-naphthoic acid. From the viewpoint of providing liquid crystallinity, the unit (I) is preferably contained in the aromatic polyester in the amount of 30 to 80 mol %, more preferably 40 to 70 mol %, and most preferably 50 to 60 mol %, with respect to all structural units in the polyester.

Structural unit (II) may be a structural unit derived from a compound selected from the group consisting of hydroquinone, 4,4'-dihydroxybiphenyl and 2,6-dihydroxynaphthalene. The unit (II) is preferably derived from 4,4'-dihydroxybiphenyl in view of heat resistance and cost, and is preferably derived from 2,6-dihydroxynaphthalene in view of thermal conductivity. The structural unit (II) can be derived from two kinds or more of different compounds, to prepare an aromatic polyester in the present invention.

Structural unit (III) may be a structural unit derived from a compound selected from the group consisting of 1,4-naphthalenedicarboxylic acid, 1,5-naphthalenedicarboxylic acid, 2,3-naphthalenedicarboxylic acid, 2,6-naphthalenedicarboxylic acid and 2,7-naphthalenedicarboxylic acid. The structural unit (III) can be derived from two kinds or more of different compounds, to prepare an aromatic polyester in the present invention. The structural unit is preferably derived from 2,6-naphthalenedicarboxylic acid in view of availability and heat resistance.

Structural unit (IV) may be a structural unit derived from a compound selected from the group consisting of terephthalic acid, isophthalic acid and phthalic acid. The structural unit (IV) can be derived from two kinds or more of different compounds, to prepare an aromatic polyester in the present invention. The structural unit is preferably derived from terephthalic acid or a mixture of terephthalic acid and isophthalic acid, from the viewpoint of heat resistance.

The total molecular amounts of units (II) to (IV) can be decided by subtracting the molecular amount of unit (I) from 100 mol % when the aromatic polyester is made from units (I) to (IV). The structural units (II) to (IV) are preferably contained in the aromatic polyester in the amount such that (II)/{(III)+(IV)} is 95/100 to 100/95. The ratio ((III)/(IV)) of structural unit (III) to structural unit (IV) is preferably is 100/1 to 50/50 from the viewpoint of low linear expansibility, and is more preferably (100/1) to (70/30). When the proportion of the structural unit (III) is smaller than the lower limit, the handling of polymerization reaction in producing the polyester may become difficult.

The aromatic polyester in the present invention preferably has a controlled polymerization. Too low degree of polymerization may deteriorate mechanical properties of the polyester. Therefore the degree of polymerization is preferably controlled so that the intrinsic viscosity thereof is in the range of from 0.3 or more, more preferably in the range of from 0.5 or more. Too high degree of polymerization may raise melting viscosity and solution viscosity of the polyester, which may deteriorate processability thereof. Therefore the degree of polymerization is preferably controlled so that the intrinsic viscosity thereof is in the range of from 5 or less, more preferably in the range of from 3 or less. The most preferable range of the intrinsic viscosity is in the range of from 0.5 to 3 in view of balance between the mechanical properties and the processability.

A method for producing an aromatic polyester in the present invention is not limited. For example, hydroxyl groups of monomers for unit (I) and/or unit (II) are acylated by using aliphatic carboxylic anhydride to obtain an acylated compound, and then the acylated compound is polymerized by deacetylation polycondensation with carboxylic groups of monomers for unit (III) and/or unit (IV) to obtain the aromatic polyester (see, JP-A-2002-220444 and JP-A-2002-146003). In addition, the aromatic polyester can be produced by a method described in JP-A-2002-146003, in which a heterocyclic compound containing two or more nitrogen atoms is added to the reaction systems during acylation and deacetylation polycondensation. The method using the heterocyclic compound is more preferable in view of heat stability of the resulting polyester.

In order to obtain an aromatic polyester in the present invention, a solid polymerization may be conducted after the deacetylation polymerization.

A resin composition in the present invention comprises the above-described aromatic polyester and an inorganic material with a thermal conductivity of 10 W/mK or higher at a temperature of 20° C.

Examples of the inorganic material used in the present invention include a metal nitride such as aluminum nitride, boron nitride and silicon nitride; a metal oxide such as aluminum oxide, magnesium oxide and silicon oxide; a carbide such as silicon carbide and boron carbide. In addition, the inorganic material may be a carbon material such as diamond, carbon black and graphite; a metal; and a metal alloy. The inorganic material is preferably aluminum nitride, boron nitride, silicon nitride, aluminum oxide, magnesium oxide or silicon oxide. More preferably, the inorganic material is a metal oxide with a relatively low dielectric constant, such as aluminum oxide and silicon oxide. A mixture of two kinds or more of the inorganic material may be used in the resin composition of the present invention.

In the case of using a metal or a metal alloy as the inorganic material, the material is selected from the group consisting of metals in groups IV–VI, periods IV–VI, metals in groups XIII–XIV, periods II–III (in the periodic table of the elements; IUPAC classification in 1989), Mg, Fe and Pb; and alloy of two kinds or more of the metals among these.

The shape of the inorganic material is not particularly limited, and may be a fibrous shape or powdery shape.

In the case that the inorganic material has a fibrous shape, it is preferred that the fiber diameter is in the range of from 0.1 to 5 μm, and the aspect ratio is in the range of from 3 or more. More preferably, the fiber diameter is in the range of from 0.1 to 5 μm, and the aspect ratio is in the range of from 10 or more. When the fiber diameter is smaller than the lower limit, the mixing of the inorganic material into the polyester may become difficult. Meanwhile, when the fiber diameter is larger than the upper limit, processability of the resulting resin composition into films may deteriorate. When the fiber diameter is smaller than the upper limit, a film obtained from the resulting resin composition comprising the inorganic material tends to have a smooth surface, which is preferred, since the inorganic material with such a diameter does not protrude from the film.

In the case that the inorganic material has a powdery shape, the material may have a particle diameter of from 0.05 to 300 μm, preferably 0.1 to 200 μm and more preferably 0.1 to 50 μm. When the particle diameter is larger than the upper limit, surface of the film obtained from the resulting resin composition comprising the inorganic material may deteriorate in some cases. Meanwhile, when the particle diameter is smaller than the lower limit, the improvement of the thermal conductivity of the resulting resin composition may be insufficient, and also the molding thereof may become difficult.

The amount of the inorganic material with respect to the aromatic polyester can be selected from a wide range depending or a thermal conductivity, strength and the like of the intended composition. The amount of the inorganic material may be in the range of from 5 to 500 parts by weight, and is preferably from 20 to 400 parts by weight, with respect to 100 parts by weight of the aromatic polyester. When the amount of the inorganic material is smaller than the lower limit, the improvement of the thermal conductivity of the resulting resin composition may be insufficient. On the other hand, when the amount of the inorganic material is larger than the upper limit, the productivity may become poor, and the resulting molded product of the resin composition may become fragile.

A resin composition in the present invention can be made into an electrical insulator, an electric conductor and the like. When the composition is made into an electrical insulator, it is preferred to use, as an inorganic material, at least one material selected from a metal nitride (such as aluminum nitride, boron nitride, silicon nitride), a metal oxide (such as aluminum oxide, magnesium oxide, silicon oxide) and diamond. When the composition is made into an electric conductor, it is preferred to use, as an inorganic material, at least one material selected from a carbide (such as silicon carbide and boron carbide), carbon black, graphite and a metal.

In the present invention, the inorganic material may be surface-treated with a coupling agent, to improve affinity of the material with the polyester at an interface therebetween as well as hydrophobic property of the material. The coupling agent may be used in the amount of from 0.01 to 5 parts by weight, and is preferably in the amount of from 0.5 to 2 parts by weight, with respect to 100 parts by weight of the inorganic material to be treated. When the amount of the coupling agent is smaller than the lower limit, improvement in the affinity and the like may be insufficient. Meanwhile, when the amount of the coupling agent is larger than the upper limit, a thermal conductivity of the resulting resin composition may deteriorate.

The coupling agent is not particularly limited, and various kinds thereof can be used. Examples of the coupling agent include silane and titanate coupling agents.

Examples of the silane coupling agent include γ-mercapto-propyl-trimethoxysilane, 2-styryl-ethyl-trimethoxysilane, N-β-(aminoethyl)γ-amino-propyl-trimethoxysilane, β-(3,4-epoxycyclohexyl)ethyl-trimethoxysilane, γ-glycidoxy-propyltrimetoxysilane, phenyltrimetoxysilane and methyldimetoxysilane, which may be used singly or in a mixture of two kinds or more of them.

Examples of the titanate coupling agent include isopropyl tri-isostearoyl titanate, isopropyl trioctanoyl titanate, isopropyl tri(dioctyl pyrophosphate)titanate, isopropyl tri-dimethacryl isostearoyl titanate, isopropyl tri(N,N-diaminoethyl)titanate, isopropyl tridodecylbenzenesulfonyl titanate, isopropyl isostearoyl diacryl titanate, isopropyl tri(dioctyl phosphate)titanate, isopropyl tricumylphenyl titanate, tetraisopropyl bis(dioctyl phosphate)titanate, tetraoctyl bis(didodecyl phosphate)titanate, tetra(2,2-diallyloxymethyl-1-butyl)bis(ditridecyl)phosphate titanate, bis(dioctyl pyrophosphate)oxyacetate titanate and bis(dioctyl pyrophosphate)ethylene titanate, which may be used singly or in a mixture of two kinds or more of them. Also, a silane coupling agent and a titanate coupling agent can be used together.

The surface treatment with the coupling agent may be conducted by adding the agent to the inorganic material in the presence of an aromatic polyester, to prepare a resin composition in the present application. The surface treatment, however, is preferably conducted prior to the mixing of the inorganic material with the aromatic polyester.

In order to improve processing properties, mechanical and electrical properties, thermal properties, surface properties and light stability, various kinds of agents can further be contained in a resin composition in the present invention as long as the effects of the present invention are not deteriorated. Examples of such an optional agent include a filler (which may have a particle shape), a reinforcing filler, a plasticizer, a lubricant, a release agent, an adherent-preventing agent, an antioxidant, heat and light stabilizers, a fire retardant, a pigment and a dyestuff.

A resin composition in the present invention can be obtained, for example, by a method in which an inorganic material is mixed through dry blend with a portion of an aromatic polyester to be used, and then the dry-blended polyester is plasticized, followed by mixing with the remaining portion of the (non-plasticized) aromatic polyester.

A resin composition may be shaped into a molded article, a film and the like. For example, the molded article can be obtained by an extrusion molding method, an injection molding method and the like. A resin composition of the present invention can be preserved and distributed in the form of pellet, and then be molded into an intended shape as required.

A film of a resin composition in the present invention may be obtained, for example, by an extrusion molding, an inflation molding, a T-die molding and the like. The film can also be obtained in a method by suspending a resin composition in the present invention in a solvent to prepare a liquid of the composition, casting the liquid on a substrate and removing the solvent.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2004-144665 filed on May 14, 2004, including specification, claims and summary, are incorporated herein by reference in their entirety.

EXAMPLES

The present invention is described in more detail by following Examples, which should not be construed as a limitation upon the scope of the present invention.

Synthesis Example 1

752.72 g (4 mol) of 2-hydroxy-6-naphthoic acid, 372.42 g (2 mol) of 4,4'-dihydroxybiphenyl, 432.38 g (2 mol) of 2,6-naphthalenedicarboxylic acid, 986.19 g (9.2 mol) of acetic anhydride and 0.159 g of 1-methylimidazole as a catalyst were introduced to a reaction vessel (with a stirring apparatus, a torquemeter, a nitrogen gas introduction pipe, a thermometer and a reflux condenser). The resulting mixture was stirred at room temperature for 15 minutes, and then was heated while stirring. After the inside temperature reached 145° C., the stirring was continued for 1 hour, while maintaining the temperature. Then, 0.798 g of 1-methylimidazole as a catalyst was further added to the mixture.

The mixture was further heated from 145° C. to 310° C. over 3 hours, while distilling off the by-produced acetic acid and the unreacted acetic anhydride. Thereafter, 0.798 g of 1-methylimidazole was further added thereto, and the same temperature was maintained for 2 hours to obtain an aromatic polyester. The obtained aromatic polyester was cooled to room temperature and was pulverized by a powdering machine to obtain a powder (with a particle diameter of approximately from 0.1 to 1 mm) of the aromatic polyester.

The powder obtained above was heated from 25° C. to 250° C. over 1 hour and then was heated to 320° C. over 5 hours. Subsequently, the temperature of 320° C. was maintained for 3 hours to conduct solid polymerization of the powder. The powder obtained after the solid polymerization was cooled, and a flow-beginning temperature thereof was measured with a flow tester (CFT-500 type, manufactured by SHIMADZU CORPORATION). The flow-beginning temperature was 313° C.

Example 1

An aluminum oxide powder (globular alumina AO-502, manufactured by TATSUMORI LTD.; thermal conductivity of 36 W/mK was mixed with the powder (aromatic polyester) obtained in Synthesis Example 1 so that the amount of the aluminum oxide was 70% by weight with respect to the total amount of the aluminum oxide and the polyester. The mixture was granulated at a cylinder temperature of 360° C. with a twin-screw extruder (PCM-30, manufactured by IKEGAI LTD.) to obtain a resin composition.

The resin composition was dried at a temperature of 120° C. for 3 hours, and was molded into a bar-shaped test piece (with a size of 64 mm×13 mm×3 mm) at a cylinder temperature of 370° C. and a mold temperature of 130° C. with an injection molding machine (PS40E5ASE type, manufactured by NISSEI PLASTIC INDUSTRIAL CO., LTD.). A thermal conductivity of the test piece was measured by a heat ray process in accordance with JIS R2618. The thermal conductivity was 2.8 W/mK.

Comparative Example 1

A resin composition was prepared in the same manner as in Example 1 except that, instead of using the aromatic polyester powder obtained in Synthesis Example 1 above, a polyphenylene sulfide (TOHPUREN PPS LR-100G, manufactured by DAINIPPON INK AND CHEMICALS, INCORPORATED) was used in the same amount of 70% by weight, and that the cylinder temperature in granulating was changed from 360° C. to 340° C.

The resin composition was molded into a test piece (with a size of 64 mm×13 mm×3 mm) in the same manner as in Example 1 except that the cylinder temperature in molding was changed from 370° C. to 350° C. The thermal conductivity of the test piece was 1.0 W/mK.

What is claimed is:

1. A resin composition comprising an inorganic material with a thermal conductivity of 10 W/mK or higher at a temperature of 20° C. and an aromatic polyester having structural units represented by formulas (I)–(IV)

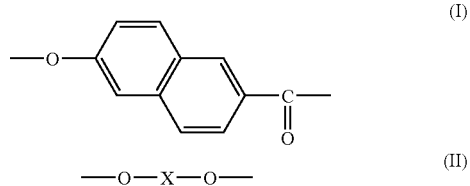

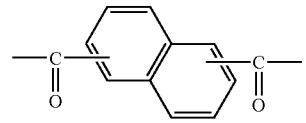

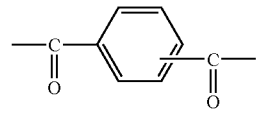

wherein x represents a structural unit selected from a group consisting of 1,4-phenylene, 4,4'-biphenylene and 2,6-naphthylene and the molar ratio of structural unit (III) to structural unit (IV) is 100/1 to 50/50.

2. A resin composition according to claim 1, wherein the inorganic material is a material selected from a group consisting of a metal nitride, a metal oxide, a carbide, diamond, carbon black, graphite, a metal and a metal alloy.

3. A resin composition according to claim 2, wherein the inorganic material is a material selected from a group consisting of aluminum nitride, boron nitride, silicon nitride, aluminum oxide, magnesium oxide, silicon oxide and diamond.

4. A resin composition according to claim 2, wherein the inorganic material is a material selected from a group consisting of silicon carbide, boron carbide, carbon black and graphite.

5. A resin composition according to claim 2, wherein the inorganic material is a material selected from a group consisting of a metal and a metal alloy.

6. A resin composition according to claim 1, wherein the inorganic material is a metal.

7. A shaped material obtainable from the resin composition according to claim 1.

8. A film obtainable by molding the resin composition according to claim 1.

9. A film obtainable by suspending the resin composition according to claim 1 in a solvent to prepare a liquid of the composition, casting the liquid on a substrate and removing the solvent.

* * * * *